(12) United States Patent
Niu et al.

(10) Patent No.: US 9,421,809 B2
(45) Date of Patent: Aug. 23, 2016

(54) PRE-TREATMENT COATING

(71) Applicant: HEWLETT-PACKARD DEVELOPMENT COMPANY, L.P., Houston, TX (US)

(72) Inventors: Bor-Jiunn Niu, San Diego, CA (US); Jason Swei, San Diego, CA (US); Haigang Chen, San Diego, CA (US); Sandeep K Bangaru, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/654,965

(22) PCT Filed: Jan. 31, 2013

(86) PCT No.: PCT/US2013/024017
§ 371 (c)(1),
(2) Date: Jun. 23, 2015

(87) PCT Pub. No.: WO2014/120175
PCT Pub. Date: Aug. 7, 2014

(65) Prior Publication Data
US 2015/0352877 A1     Dec. 10, 2015

(51) Int. Cl.
*B41M 5/00* (2006.01)
*B41M 5/52* (2006.01)
*C09D 103/02* (2006.01)
*C09D 129/04* (2006.01)
*C09D 7/00* (2006.01)
(Continued)

(52) U.S. Cl.
CPC ......... *B41M 5/5227* (2013.01); *B41M 5/0017* (2013.01); *B41M 5/5245* (2013.01); *C09D 7/001* (2013.01); *C09D 7/1216* (2013.01); *C09D 7/1283* (2013.01); *C09D 103/02* (2013.01); *C09D 129/04* (2013.01); *C08K 3/16* (2013.01); *C08K 5/01* (2013.01); *C08K 2003/162* (2013.01); *C08K 2003/164* (2013.01)

(58) Field of Classification Search
CPC ............ B41M 5/5227; B41M 5/5245; B41M 5/5254; B41M 5/0017; C09D 7/1216; C09D 7/1283
See application file for complete search history.

(56) References Cited

U.S. PATENT DOCUMENTS

| | | |
|---|---|---|
| 6,513,924 B1 * | 2/2003 | Goldberg ............... B41J 3/4078 347/102 |
| 6,906,019 B2 | 6/2005 | Nitzan et al. |

(Continued)

FOREIGN PATENT DOCUMENTS

| | | |
|---|---|---|
| JP | H0274391 | 3/1990 |
| JP | 2002264527 | 9/2002 |

(Continued)

*Primary Examiner* — Betelhem Shewareged
(74) *Attorney, Agent, or Firm* — Thorpe, North & Western L.L.P.

(57) ABSTRACT

The present disclosure provides pre-treatment coatings, media substrates, and related methods. As such, a pre-treatment coating can include an evaporable solvent, a matrix, and a wax. The matrix can include a binder and a fixer, and the wax can include wax particles dispersed within the matrix. At least a portion of the wax particles can have a particle size that is greater than a thickness of the matrix when the pre-treatment coating is applied to a media substrate at a basis weight from 0.5 gsm to 20 gsm and the evaporable solvent removed.

18 Claims, 1 Drawing Sheet

(51) Int. Cl.
*C09D 7/12* (2006.01)
*C08K 3/16* (2006.01)
*C08K 5/01* (2006.01)

(56) References Cited

U.S. PATENT DOCUMENTS

| | | |
|---|---|---|
| 2006/0040061 A1 | 2/2006 | Jensen Moller |
| 2010/0013875 A1 | 1/2010 | Diederen et al. |
| 2010/0295891 A1 | 11/2010 | Goto et al. |
| 2011/0148980 A1 | 6/2011 | Arai et al. |
| 2011/0303113 A1 | 12/2011 | Sarkisian et al. |
| 2012/0169808 A1 | 7/2012 | Kiyomoto et al. |
| 2013/0293647 A1* | 11/2013 | Dannhauser ......... B41M 5/0017 347/102 |

FOREIGN PATENT DOCUMENTS

| | | |
|---|---|---|
| JP | 2004021263 | 1/2004 |
| JP | 2004276253 | 10/2004 |
| JP | 2012176583 | 9/2012 |

* cited by examiner

PRE-TREATMENT COATING

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure, or oscillation onto the surface of a media.

Pre-treatment compositions or coatings can likewise be applied to various media to improve printing characteristics and attributes of an image. Such composition can be substantially colorless and can be formulated to interact with the colorant and/or with polymeric components of certain ink compositions. With the use of such pre-treatment compositions, precipitated colorants deposited on the surface of recording media can provide enhancement of image quality. For example, improved optical density and high speed printing may be achieved with such pre-treatment compositions. However, many pre-treatment formulations that are acceptable in one area are not as acceptable in others, and thus, research and development related to pre-treatment formulations that can produce higher quality print images on the print media surfaces continue to be sought.

BRIEF DESCRIPTION OF THE DRAWINGS

Additional features and advantages of the disclosure will be apparent from the detailed description which follows, taken in conjunction with the accompanying drawings, which together illustrate, by way of example, features of the invention; and, wherein.

Figure 1:
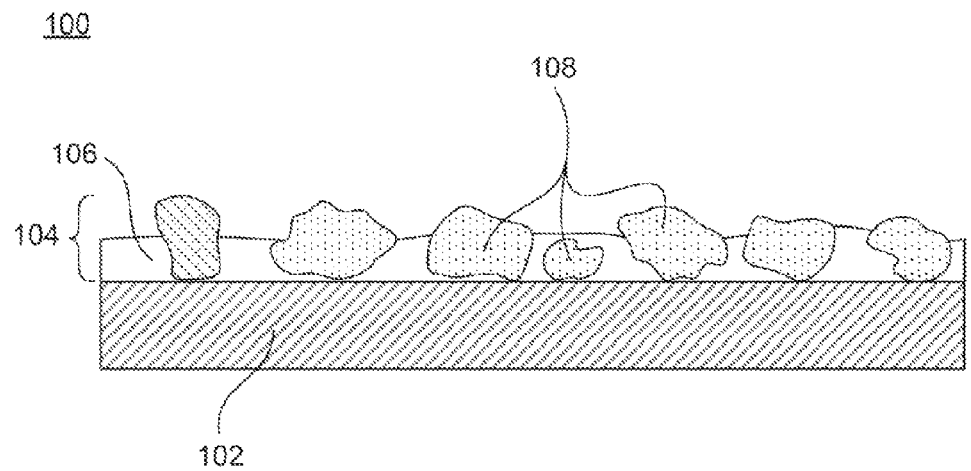
FIG. 1 provides a cross-sectional view of a pre-treatment coating on a print medium in accordance with an example of the present disclosure.

Reference will now be made to several examples are illustrated herein, and specific language will be used herein to describe the same. It will nevertheless be understood that no limitation of the scope of the disclosure is thereby intended.

DETAILED DESCRIPTION

It has been recognized that traditional pre-treatment coatings that can provide high quality print images lack durability when used in packaging applications or similar applications that subject the printed images to a high degree of surface contact. As such, it has been discovered that the use of wax particles in pre-treatment coatings can provide excellent durability, thereby preserving the quality of the printed image even with more significant surface to surface contact. Specifically, the pre-treatment coatings of the present disclosure can include wax particles having a particle size that is greater than the thickness of a matrix that is also used in the pre-treatment coating.

It is noted that when discussing the present compositions, media substrates, and methods, each of these discussions can be considered applicable to each of these embodiments, whether or not they are explicitly discussed in the context of that embodiment. Thus, for example, in discussing a wax in a pre-treatment coating, such a wax can also be used in a method of providing a durable coating to a print medium, and vice versa.

As such, a pre-treatment coating can include an evaporable solvent, a matrix, and a wax. The matrix can include a binder and a fixer; and the wax can include wax particles dispersed within the matrix. At least a portion of the wax particles can have a particle size that is greater than a thickness of the matrix when the pre-treatment coating is applied to a media substrate at a basis weight from 0.5 gsm to 20 gsm and the evaporable solvent removed.

In another example, a media substrate can include a pre-treatment coating applied to the media substrate. The pre-treatment coating can include a matrix and wax particles. The fixer can include a fixer and a binder, and the wax particles can have an average particle size from 100 nm to 100 μm. At least a portion of the wax particles cam have a particle size that is larger than a thickness of the matrix. It is noted that no evaporable solvent is described in this specific example, as the pre-treatment coating applied to the media substrate is described after the solvent has been removed and the pre-treatment coating is in a state to receive inkjet or other printing inks.

It is noted that the term "pre-treatment coating" refers to either a composition used to form a coating layer as well as the coating layer itself, the context dictating which is applicable. For example, a ore-treatment coating that includes an evaporable solvent is typically referring to the compositional coating that is applied to a media substrate. Once coated on a media substrate and after the evaporable solvent is removed, the resulting coating layer can also be referred to as a pre-treatment coating.

Generally, in each of these examples, the matrix includes the components of the pre-treatment coating except for the wax. The wax contains wax particles that extend beyond the underlying matrix as described herein. It has been discovered that such a structure allows the wax particles to protect the underlying matrix when the pre-treatment coating contacts other substrates, objects, etc. The resulting effect is excellent durability of the pre-treatment coating and printed images that may be printed thereon. Such durability provides retention of the print quality of the printed image, which can be measured by gloss, optical density, color bleed, scratch resistance, coalescence, water smudge, etc.

Generally, the wax includes wax particles that when printed on a print medium, the average particle size that is greater than the thickness of the pre-treatment matrix. Turning to FIG. 1, a coated medium 100 can include a print medium 102 coated with a pre-treatment coating 104. The pre-treatment coating can include a matrix 106 embedded with wax particles 108. The wax particles generally extend above the surface of the matrix, though it is not required that all of the wax particles be larger in size than the thickness of the matrix. For example, the size of at least a portion of the wax particles can be greater than the thickness of the matrix. In one example, at least 50% of the wax particles can have a particle size greater than the thickness of the matrix. In one aspect, at least 75% of the wax particles can have a particle size greater than the thickness of the matrix. In one specific aspect, at least 90% of the wax particles can have a particle size greater than the thickness of the matrix. In one example, the matrix can have a thickness of 100 nm to 100 μm and the wax can have an average particle size of 100 nm to 100 μm. Though these ranges overlap, it is understood that a portion of the wax particles will be larger in size than the thickness of the matrix.

In further detail regarding the wax particle size, these wax particles can have an average particle size of from 100 nm to 100 μm, from 0.5 μm to 100 μm, from 0.5 μm to 50 μm, or from 1 μm to 50 μm, for example. In another example, the wax particles can have an average particle size of 5 μm to 50 μm. In still another example, the wax particles can have an average particle size of 5 μm to 12 μm. In one aspect, the wax particles can have an average particle size of 12 μm to 20 μm. In one specific aspect, the wax particles can have an average particle size of about 8 μm. In another aspect, the wax particles can have an average particle size of about 15 μm to 18 μm. When particles are non-spherical, the largest diameter sphere that can be fitted within the particle can be considered D1. The smallest diameter sphere that can completely contain the particle can be considered D2. In one example, the "particle size" can be measured as the average of D1 and D2, which is referred to simply as D. Thus, when referring to "particle size" herein, the particle diameter D can be calculated, "Average particle size," on the other hand, refers to a plurality of particles, each having its own particle size, which are collectively averaged. Additionally, the wax particles can be spread throughout the coating such that the particles have an average spacing S that is at least twice the diameter D of the particles. In one example, the average spacing S is at least 3 times D. In another example the average spacing S is at least 4 times D.

Additionally the wax particles can be distributed so as to have an area density coverage that is within a specific range. The area density coverage is the percentage of the area of the media covered by the particles. According to this metric, each particle covers a portion of the media that is defined by a cylindrical projection of the particle that is normal to the media. Thus, the area covered would be defined by a circle having the same diameter (D) as the particle. In one example, the area density coverage would be in the range of 0.5% to 30% of the area of the media. In yet a more specific aspect, the area density coverage would be 1% to 10% of the area of the media. Some specific examples of area density coverage would be about 1%, about 4%, about 5% coverage. In general an area coverage density that is above about 30% coverage may begin to adversely impact print quality. An area coverage density below about 0.5% may be insufficient to provide scratch and/or rub resistance of an image printed upon the media.

Generally, the wax particles can be chosen such that the ratio of the wax particle size to the thickness of the pre-treatment coating plus any printed ink thereon is greater than 1. Such a ratio provides that the wax particles extend above the surface of any printing on the pre-treatment coating, thereby protecting the underlying printed image. In one example, the ratio can range from 10:1 to 1.01:1, and in one aspect, can range from 3:1 to 1.01:1. In another specific aspect, the ratio can range from 2:1 to 1.01:1, or even 1.1:1 to 1.01:1.

The wax can be selected based on various printing factors such as compatibility, particle size, melting point, etc. Typically, waxes are available as wax emulsions. Wax emulsions are commercially available from a number of vendors, for example Keim-Additec, Lubrizol, Michelman, and BYK Chemie. Wax emulsions useful for the present compositions can include but are not limited to Lubrizol: Liquilube™ 411, Liquilube™ 405, Liduilube™ 488, Liquilube™ 443, Liquilube™ 454; Michelman: ME80825, ME48040, ME98040M1, ME61335, ME90842, ME91240, ML180: Keim-Additec Ultralube® E-521/20, Ultralube® E-7093, Ultralube® 7095/1 Ultralube® E-8046, Ultralube® D806, Ultralube® E-502V, Ultralube® E-842N: Byk: Aquacer® 2650, Aquacer® 507, Aquacer® 533, Aquacer® 515, Aquacer® 537, Aquaslip™ 671, Aquaslip™ 942; Arkema: Orgasol® 2001 EXD NAT1, 3501 EXD NAT 1; Elementis: Slip-ayd® SL300, Slip-ayd® SL1618, Slip-ayd® 295A, combinations thereof, and the like.

Wax suspended in water includes, but is not limited to, particles of a synthetic wax, a natural wax, a combination of a synthetic wax and a natural wax, a combination of two or more different synthetic waxes, or a combination of two or more different natural waxes, for example. In some examples, the synthetic wax includes, but is not limited to, polyethylene, polypropylene, polybutadiene, polytetrafluoroethylene, polyvinylfluoride, polyvinyldiene fluoride, polychlorotrifluoroethylene, perfluoroalkoxy polymer, perfluoropolyether, polyurethane, polyethylenechlorotrifluoroethylene, polyethylene-vinyl acetate, epoxy resin, silicone resin, polyamide resin, polyamide, or polyester resin. In some examples, the natural wax includes, but is not limited to, carnauba wax, paraffin wax, mortar wax, candelilla wax, ouricury wax, sufarcane wax, retamo wax, or beeswax. In one example, the wax can be a polyethylene wax.

In one example, the wax can have a melting point ranging from 60° C. to 150° C. Generally, the wax can be present in the pre-treatment coating at a concentration ranging from 5 wt % to 30 wt %. In one example, the wax may be present in the range of 5 wt % to 20 wt %. In another example, the wax can be present ranging from 10 wt % to 20 wt %, and in one aspect, 11 wt % to 17 wt %. It is notable that these weight percentages of the wax are based on a total amount present in the pre-treatment coating after removal of any evaporable solvent. Thus, they are intended to be weight percentages by solids once the pre treatment coating is applied to the media substrate and the evaporable solvent is driven off, i.e. the final wt % on the coated media substrate.

Additionally, the wax emulsions can be compatible binders and dispersants. By compatible, the present waxes can be used without causing aggregation or precipitation of the dispersants/binders particularly over extended periods of time (weeks/months at ambient temperature or days/weeks at elevated temperature such as 40° to 65° C.). Incompatibility can manifest itself variously by increases in wax particle size, phase separation of wax, or creaming a faster rate than in the absence of destabilizing materials.

As discussed herein, the matrix generally includes the remaining (non-wax) elements of the pre-treatment composition. The evaporable solvent is not part of the matrix either, as it is removed from the pre-treatment coating composition after application to the media substrate. The solvent can include or be water, or another aqueous or other solvent system that can be removed after application. Like the wax, it is notable that the matrix weight percentages herein are based on a total amount present in the pre-treatment coating after removal of any evaporable solvent. Thus, the weight percentages are intended to be weight percentages by solids once the pre-treatment coating is applied to the media substrate and the evaporable solvent is driven off, i.e. the final wt % on the coated media substrate, whether discussed in the context of the coating composition or the finished coating.

The fixer can be a polyvalent metal salt. The polyvalent metal salt can be a divalent or a higher polyvalent metallic ion and anion. In one example, the polyvalent metal salt components can be soluble in water. Examples of polyvalent metallic ions include divalent metallic ions, such as $Ca^{2+}$, $Cu^{2+}$, $Ni^{2+}$, $Mg^{2+}$, $Zn^{2+}$ and $Ba^{2+}$; trivalent metallic ions, such as $Al^{3+}$, $Fe^{3+}$ and $Cr^{3-}$. In one example, the polyvalent metallic ion can be $Ca^{2+}$, $Mg^{2+}$ or $Zn^{2+}$. In one aspect, the polyvalent metallic ions can be $Ca^{2+}$. Examples of anions include $Cl^-$, $I^-$, $Br^-$, $NO_3^-$ or $RCOO^-$ (where R is H or any hydrocarbon chain). In one example, the polyvalent metal salt anion can be a chloride ($Cl^-$) or acetate ($CH_3COO^-$). In other examples, the polyvalent metal salt can include divalent or polyvalent metallic ions and of nitrate or carboxylate ions. The carboxylate ions can be derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid.

In one example, the fixer can be a polyvalent metal salt including calcium chloride, calcium nitrate, magnesium nitrate magnesium acetate or zinc acetate. In one aspect, the polyvalent metal salt can be calcium chloride or calcium nitrate ($CaCl_2$ or $Ca(NO_3)_2$). In one specific aspect, the polyvalent metal salt can be calcium chloride ($CaCl_2$). In another example, the fixer can be aluminum chlorohydrate (ACH).

Generally, the fixer can be present in the pre-treatment coating at a concentration ranging from 5 wt % to 80 wt %. In one example, the fixer can be present in an amount ranging from 50 wt % to 70 wt %, and in another example, from 5 wt % to 50 wt %. In one aspect, the fixer can be present at from 5 wt % to 15 wt %, In yet another example, the fixer can be present at a concentration range of 10 wt % to 20 wt %. The amount can be dependent upon the print medium used. For example, when used on a microporous or uncoated medium, the fixer can be present above 50 wt % while, when used on an offset medium, the fixer can be present below 50 wt %. It is understood that these ranges are not intended to be limiting and that the amounts can be adjusted for the desired application. Furthermore, it is notable that these weight percentages of the fixer are based on a total amount present in the pre-treatment coating after removal of any evaporable solvent. Thus, they are intended to be weight percentages by solids once the pre-treatment coating is applied to the media substrate and the evaporable solvent is driven off, i.e. the final wt % on the coated media substrate.

Examples of suitable binders that can be used include polyvinyl alcohols (PVAs, including water-soluble PVA copolymers such as copolymers of PVA and polyethylene oxide) or copolymers of PVA and polyvinylamine, cationic PVAs, acetoacetylated PVAs, and silyl-modified PVA); polyvinyl acetates; polyvinyl pyrrolidones (including copolymers of polyvinyl pyrrolidone and polyvinyl acetate); starch; modified starch (including oxidized and etherified starches) water soluble cellulose derivatives (including carboxymethyl cellulose and hydroxyethyl cellulose); polyacrylamides (including polyacrylamide derivatives and copolymers); casein; gelatin; soybean protein; conjugated diene copolymers (including maleic anhydride resin and styrene-butadiene copolymer); acrylic polymers (including polymers and copolymers of acrylic and methacrylic acids); vinyl polymers (including ethylene-vinyl acetate copolymers); functional group modified polymers (including those obtained by modifying the above-mentioned polymers with monomers containing functional groups such as carboxyl, amino, amido, and sulfo groups); cationic polymers, including cationic polyamides; aqueous binders of thermosetting resins (including melamine resins and urea resin); and synthetic resin binders (including polymethyl methacrylate, polyurethane resin, polyester resin, amide resin, vinyl chloride-vinyl acetate copolymer, polyvinyl butyral, and alkyl resins).

In one example, the binder can be polyvinyl alcohol (PVA). When used as the binder, PVA can have a degree of hydrolysis from 72% to 99%, and, in one aspect, between about 88% and about 95%. The weight average molecular weight of PVA can be from about 1,000 Mw to 500,000 Mw, or in one aspect, from 5,000 Mw to 500,000 Mw. Additionally, in one example, the binder can be a starch or modified starch. In another example, the binder can be a cationic polyimide.

Generally, the binder can be present in the pre-treatment coating at a concentration ranging from 0.1 wt % to 80 wt %. In one example, the binder can be present in an amount ranging from 10 wt % to 35 wt %, and in one aspect, 0.1 wt % to 5 wt %, In another aspect, the binder can be present in the range of 15 wt % to 25 wt %. In still another aspect, the binder can be present in the range of 5 wt % to 35 wt %. In another example, the binder can be present in the range of 70 wt % to 80 wt %. The amount can be dependent upon the print medium used. For example, when used on a microporous or uncoated medium, the binder can be present above 10 wt % while when used on an offset medium, the binder can be present below 5 wt %. It is understood that these ranges are not intended to be limiting and that the amounts can be adjusted for the desired application. Furthermore, it is notable that these weight percentages of the binder are based on a total amount present in the pre-treatment coating after removal of any evaporable solvent. Thus, they are intended to be weight percentages by solids once the pre-treatment coating is applied to the media substrate and the evaporable solvent is driven off, i.e. the final w % on the coated media substrate.

In addition to the above, the matrix can include a latex particle. In one example, the latex particle can be made of polymers and copolymers including acrylic polymers or copolymers, vinyl acetate polymers or copolymers, polyester polymers or polymers: vinylidene chloride polymers or copolymers, butadiene polymers or copolymers, styrene-butadiene polymers or copolymers, acrylonitrile-butadiene polymers or copolymers. In another example, the latex particle can include a vinyl acetate-based polymer, an acrylic polymer, a styrene polymer, a styrene-butadiene (SBR)-based polymer, a polyester-based polymer, a vinyl chloride-based polymer, an acid-based polymer, or the like. In one aspect, the latex particle can be a polymer of a copolymer including acrylic polymers, vinyl-acrylic copolymers and acrylic-polyurethane copolymers. In another aspect, the latex particle can be cationic acrylate latex.

Generally, the latex particles can have a weight average molecular weight (Mw) of 5,000 Mw to 500,000 Mw. In one example, the latex particles can range from 150,000 Mw to 300,000 Mw. In some examples, the average particle size of the latex particles can be from 10 nm to 1 μm and, as other examples, from 10 nm to 500 nm, and in yet other examples, from 50 nm to 250 nm. The particle size distribution of the latex is not particularly limited, and either latex having a broad particle size distribution or latex having a narrow dispersed particle size distribution may be used. It is also possible to use two or more kinds of polymer fine particles each having a narrow dispersed particle size distribution in combination.

In one example, the glass transition temperature (Tg) of the latex particle ranges from −30° C. to 120° C. and, in sonic other examples, ranges from 50° C. to 120° C. In one aspect, the glass transition temperature of the latex particle can be between 100° C. and 120° C. In another aspect, the glass transition temperature of the latex particle can range from −25° C. to 30° C. In one example, multiple latex particles can be used including a high Tg latex particle (≥80° C.) and a low Tg particle (<80° C.). The glass transition temperature (Tg) parameter can be measured by Differential Scanning calorimetry (DSC).

Depending on the formulation and the media substrate selected for use, the latex particles can be included at from 5 wt % to 80 wt %, from 5 wt % to 30 wt %, or from 10 wt % to 50 wt %. Again, it is notable that these weight percentages of the latex particle are based on a total amount present in the pre-treatment coating after removal of any evaporable solvent.

Further, the matrix can contain surfactants. Non-limiting examples of suitable surfactants include nonionic surfactant, cationic surfactant and combinations thereof. In one example, the surfactant can be a nonionic surfactant. In one aspect, the surfactant can be a nonionic surfactant including nonionic fluorosurfactant, nonionic acetylenic diol surfactant, nonionic ethoxylated alcohol surfactant, and combinations thereof.

Several commercially available nonionic surfactants that can be used in the formulation of the pre-treatment composition include ethoxylated alcohols such as those from the Tergitol® series (e.g., Tergitol® 15S30, Tergitol® 15S9), manufactured by Dow Chemical; surfactants from the Surfynol® series (e.g., Surfynol® 440 and Surfynol® 465), and Dynol™ series (e.g. Dynol™ 607 and Dynol™ 604) manufactured by Air Products and Chemicals, Inc.: fluorinated surfactants, such as those from the Zonyl® family (e.g., Zonyl® FSO and Zonyl® FSN surfactants), manufactured by E.I. DuPont de Nemours and Company: Alkoxylated surfactant such as Tega® Wet 510 manufactured from Evonik; fluorinated PolyFox® nonionic surfactants (e.g., PF159 nonionic surfactants), manufactured by Omnova; or combinations thereof. Suitable cationic surfactants that may be used in the pre-treatment composition include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

The surfactant can be present in the pre-treatment composition in an amount up to about 1.5 weight percentage (wt %). In one example, the surfactant can be present in an amount ranging from about 0.1 wt % to about 1 wt %. In one aspect, the surfactant can be present in an amount ranging from about 0.2 wt % to about 0.6 wt %. These weight percentages include to total amount present in the pre-treatment coating after removal of any evaporable solvent.

Other additives can be added to the pre-treatment matrix including cross-linkers, defoamers, plasticizers, fillers, stabilizers, dispersants biocides, optical brighteners, viscosity modifiers, leveling agents, UV absorbers, anti-ozonants, etc. Such additives can be present in the pre-treatment compositions in amounts from 0.01 wt % to 20 wt %. Generally, the cross-linker can cross-link the binder.

The pre-treatment coatings of the present disclosure can be suitable for use on many types of substrates of print media, including but not limited to, paper media, nonporous media, swellable media, microporous media, photobase media: offset media, coated media, uncoated media, and other types of media including plastics, vinyl media, fabrics, woven substrate, etc. In one example, the substrate can be an uncoated media, a microporous media, or an offset media.

Figure 2:
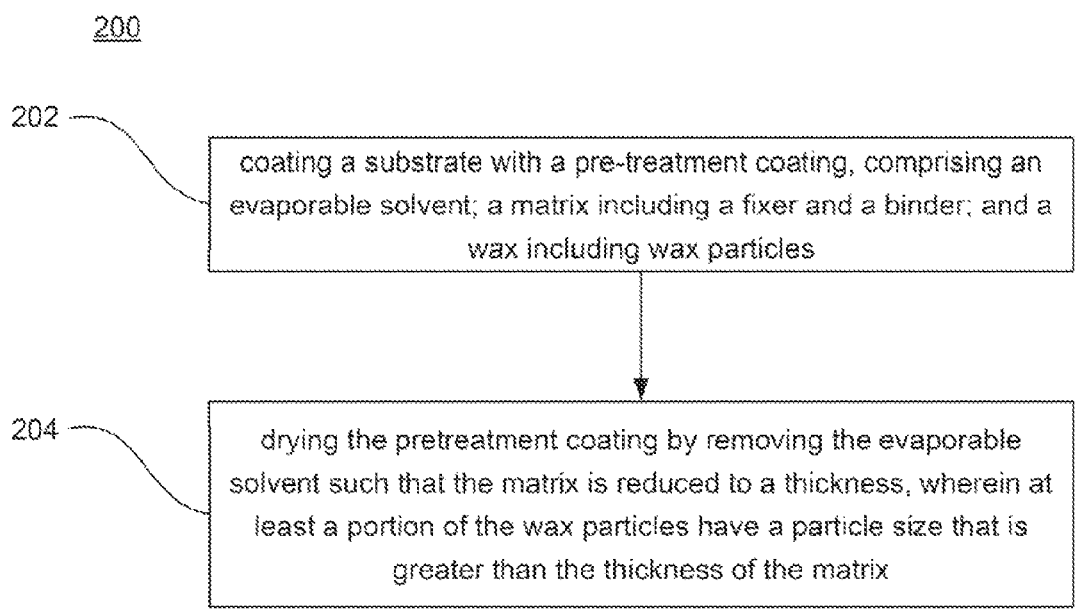
FIG. 2 depicts a flow chart of a method in accordance with an example of the present disclosure.

Referring to FIG. 2, a method 200 of providing a durable coating to a print medium can include coating 202 a substrate with a pre-treatment coating, the pre-treatment coating including any of those described herein, and drying 204 the pre-treatment coating by removing the evaporable solvent such that the matrix is reduced to a thickness, where at least a portion of the wax particles has a particle size that is greater than the thickness of the matrix. General coating methods include slot-die coating, rod coating such as Mayer rod coating, blade coating, gravure coating, knife-over-roll coating, cascade coating, curtain coating, and the like. Generally, the pre-treatment coatings can be applied at a basis weight of 0.5 gsm to 20 gsm. In one example, the basis weight can be from 0.5 gsm to 10 gam, and in one aspect, from 0.5 gsm to 5 gsm, During manufacture and subsequent application to a print medium, the present pre-treatment coatings initially include an evaporable solvent, e.g., water or other evaporable solvent or solvent system, allowing for processability, which can be removed via drying, heating, or ambient evaporation over time.

The present pre-treatment coatings are generally used in conjunction with an inkjet ink. Such inkjet inks generally include a colorant dispersed or dissolved in an ink vehicle. As used herein. "liquid vehicle" or "ink vehicle" refers to the liquid fluid in which a colorant is placed to form an ink. Ink vehicles are well known in the art, and a wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment.

Typical ink vehicle formulations can include water, and can further include co-solvents present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant, the balance of the formulation can be purified water, and the inkjet ink can optionally include a latex.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R. T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," 'an,' and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc Additionally, a numerical range with a lower end of "0" can include a sub-range using "0.1" as the lower end point.

EXAMPLES

The following examples illustrate the pre-treatment compositions and methods that are presently known. However, it is to be understood that the following are only exemplary or illustrative of the application of the principles of the present compositions and methods. Numerous modifications and alternative pre-treatment compositions and methods may be devised by those skilled in the art without departing from the spirit and scope of the present compositions and methods. The appended claims are intended to cover such modifications and a'range Thus, while the present pre-treatment compositions and methods have been described above with particularity, the following examples provide further detail in connection with what are presently deemed to be acceptable embodiments.

Example 1

Pre-Treatment Coating

A pre-treatment composition was prepared by admixing the components according to Table 1. The weight percentages in the right column are dry weight percentages according to the coating after it is applied and the evaporable solvent removed.

TABLE 1

| Ingredients | Pre-treatment Coating (wt %) |
|---|---|
| CaCl$_2$ Fixer | 64.94 |
| Starch | 12.99 |
| Lucidene ™ 645 | 8.66 |
| Slip-Ayd ® SL300 | 12.99 |
| Tego ®wet 510 | 0.42 |

This example sets forth a pre-treatment composition or primer that can be utilized to treat Kraft or open cell paper or papers with similar properties prior to inkjet printing. The pre-treatment coating was applied to the paper and then dried. Upon being dried, the coating exhibits a matrix thickness that is in the range of 0.5 to 10 microns with a design center of approximately 3 microns. Because the media receiving this primer is a porous media, a high fixer (calcium chloride) concentration that is in the range of 60 wt % to 80 wt % is used. The starch and the Lucidene™ 645 provide act as the binder. Besides providing a binder function, the starch adjusts the viscosity of the primer solution to a desired level. The binder helps to keep the salt on the surface of the media, improving fixing efficiency. The Slip-Ayd® SL300 is a polyethylene wax beads having an average particle size of about 15-18 microns. The Tego® wet 510 is the surfactant.

For this formulation, the wax concentration can be in the range of 10 wt % to 15 wt % of the dry weight of formulation. The beads have a size or effective size in the range of approximately 15 to 18 microns. The matrix thickness is, on average, in the range of about 5 microns.

Example 2

Comparative Pre-Treatment Coating

A pre-treatment composition was prepared by admixing the components according to Table 2. The weight percentages in the right column are dry weight percentages according to the coating after it is applied and the evaporable solvent removed.

TABLE 2

| Ingredients | Pre-treatment Coating (wt %) |
|---|---|
| Aluminum Chlorohydrate | 39.41 |
| Calcium Chloride | 19.7 |
| Cationic Polyamide | 9.85 |
| Polyvinyl Alcohol | 29.56 |
| Boric Acid | 1.48 |

This example provides a pre-treatment coating or primer that can be utilized to treat open cell or Kraft paper, offset coated paper, or other papers prior to inkjet printing. The pre-treatment coating was applied to the paper and then dried. Upon being dried, the pre-treatment coating had a matrix thickness that is in the range of 0.5 to 10 microns with a design center of approximately microns. Because the media receiving this primer is a porous media, a relatively high fixer concentration is in the range of 40 wt % to 60 wt % can be used, i.e. aluminum chlorohydrate and calcium chloride in this example. The cationic polyamide and the PVA act as the binder. Besides providing a binder function, the PVA adjusts the viscosity of the primer solution to an acceptable level. The binder also helps to keep the salt on the surface of the media, improving fixing efficiency, in this comparative example, there are no wax particles.

Example 3

Pre-Treatment Coating

A pre-treatment composition was prepared by admixing the components according to Table 3. The weight percentages in the right column are dry weight percentages according to the coating after it is applied and the evaporable solvent removed.

TABLE 3

| Ingredients | Pre-treatment Coating (wt %) |
|---|---|
| Aluminium Chlorohydrate | 32.92 |
| Calcium Chloride | 16.46 |
| Cationic Polyamide | 8.23 |
| Polyvinyl Alcohol | 24.69 |
| Boric Acid | 1.23 |
| Ultralube ® D806 | 16.46 |

This example provides a pretreatment coating or primer that can be utilized to treat Kraft paper, offset coated paper, or papers with similar properties prior to inkjet printing. The pre-treatment coating was applied to the paper and then dried. Upon being dried, the primer h matrix thickness that is in the range of 0.5 to 10 microns with a design center approximately 3 microns. Because the media receiving this primer is a porous media, a high fixer concentration in the range of 40 wt % to 80 wt % can be used, i.e. aluminum chlorohydrate and calcium chloride. The cationic polyamide and the PVA act as the binder. Besides providing a binder function, the PVA adjusts the viscosity of the primer solution to an acceptable level. The binder also helps to keep the salt on the surface of the media, improving fixing efficiency. The Ultralube® D806 provide the polyethylene wax beads having an average particle size of about 6 microns.

For this formulation, the wax concentration can be in the range of 10 wt % to 20 wt % of the dry weight of formulation. The beads have a size or effective diameter in the range of approximately 4 to 8 microns, and the average matrix thickness is in the range of about 3 microns.

Example 4

Pre-Treatment Coating

A pre-treatment composition was prepared by admixing the components according to Table 4. The weight percentages in the right column are dry weight, percentages according to the coating after it is applied and dried.

TABLE 4

| Ingredients | Pre-treatment Coating (wt %) |
|---|---|
| Fixer (e.g., CaCl2) | 11.44 |
| Binder (PVOH) | 0.38 |
| Binder (Lucidene ™ 645) | 11.43 |
| Fusible Cationic Acrylic Latex | 64.79 |

TABLE 4-continued

| Ingredients | Pre-treatment Coating (wt %) |
|---|---|
| Wax Beads (Slip-Ayd ® SL300) | 11.43 |
| Surfactant (Tego ®wet 510) | 0.38 |
| De-Foamer (Deairex 3040) | 0.15 |

This is an example of a pre-treatment coating or primer used to treat a number of commercial printing papers including Kraft media and coated media. Examples of coated media may include coated offset media. The pre-treatment coating was applied to the paper and then dried. Upon being dried, the primer had a matrix thickness in the range of 2 microns to 5 microns with a design center of approximately 3.6 microns. The wax beads have a size or effective diameter range of about 15 microns to about 18 microns. Therefore, the ratio of the effective bead diameter to the matrix thickness is about 4 to 1. The area coverage of the beads is about 4-5% after the pre-treatment coating is applied and dried on the media.

Example 5

Data

The pre-treatment coatings of Examples 1, 2, 3 and 4 were tested for scratch resistance by Sutherland 2000 Rub Tester. The ranking is based on 1 to 5 scale and 1 is the worst and 5 is the best.

| Coating | Scratch Resistance |
|---|---|
| 1 | 5 |
| 2 | 2 |
| 3 | 5 |
| 4 | 5 |

The Sutherland® Rub test results demonstrated that the addition of large particle wax significantly improved the scratch resistance.

The fusible cationic latex in Example 4 is a high Tg latex which creates a micro-porous coating, in which the high Tg latex stays in particle form prior to printing. This micro-porous coating allows water and other liquid solvents from the ink to pass through while keeping the ink pigments on the surface. Upon heating/drying after printing, the high Tg latex will soften, allowing for good adhesion to the ink. The higher the temperature and longer the drying, especially if the latex is heated above the Tg, the latex can film form and further improve the ink adhesion.

The Lucidene™ 645 and PVA in Example $ act as a binder to hold the particles together and adhere the pre-treatment coating to the substrate. The Lucidene™ 645 is an acrylic-urethane copolymer having a lower Tg than the fusible cationic latex and improves the coating film durability.

What is claimed is:
1. A pre-treatment coating, comprising:
an evaporable solvent;
a matrix coating including a binder and a fixer; and
a wax including wax particles dispersed within the matrix,
wherein the wax particles are present at from 11 wt % to 17 wt % based on the total weight of the pre-treatment coating after removal of the evaporable solvent, wherein at least a portion of the wax particles have a particle size that is greater than a thickness of the matrix when the pre-treatment coating is applied to a media substrate at a basis weight ranging from 0.5 gsm to 20 gsm and the evaporable solvent removed.

2. The pre-treatment coating of claim 1, wherein the wax is selected from the group of polyethylene wax, polyethylene, polypropylene, polyamide, polytetrafluoroethylene, carnuba, and mixtures thereof.

3. The pre-treatment coating of claim 1, wherein the matrix has a thickness of 100 nm to 50 μm and wherein the wax has a particle size of 0.5 μm to 100 μm, and wherein the particle size of at least 50% of the wax particles is greater than the thickness of the matrix after application and removal of the evaporable solvent.

4. The pre-treatment coating of claim 1, wherein the fixer is a polyvalent salt or aluminum chlorohydrate.

5. The pre-treatment coating of claim 1, wherein the binder includes starch, polyurethane, cationic polyurethane, cationic polyamide binder, or polyvinyl alcohol.

6. The pre-treatment coating of claim 1, wherein the matrix further comprises a latex.

7. The pre-treatment coating of claim 1, wherein the matrix further comprises at least one of a surfactant, a defoamer, and a cross-linker that crosslinks the binder.

8. A printable medium, comprising:
a media substrate; and
a pre-treatment coating applied to the media substrate, the pre-treatment coating, comprising:
a matrix, including:
a fixer, and
a binder; and
wax particles having an average particle size from 100 nm to 100 μm, wherein the wax particles are present at from 11 wt% to 17 wt% based on the total weight of the pre-treatment coating;
wherein at least a portion of the wax particles have a particle size that is larger than a thickness of the matrix.

9. The printable media of claim 8, wherein the media substrate is an uncoated medium, a microporous medium, or an offset medium.

10. The printable media of claim 8, wherein at least 50% of the wax particles have a particle size greater than the thickness of the matrix.

11. The printable media of claim 8, wherein the wax particles have an average spacing in the matrix that is at least twice an average size of the wax particles.

12. The printable media of claim 8, wherein the wax particles in the matrix have an area density coverage in the range of 0.5% to 30%.

13. The printable media of claim 8, wherein an average size of wax particles to thickness of the matrix is at a ratio from 10:1 to 1.01:1.

14. A method of providing a durable coating to a print medium, comprising:
coating a substrate with a pre-treatment coating, comprising:
an evaporable solvent;
a matrix including a fixer and a binder, and
a wax including wax particles, wherein the wax particles are present at from 11 wt % to 17 wt % based on the total weight of the pre-treatment coating after removal of the evaporable solvent; and
drying the pre-treatment coating by removing the evaporable solvent such that the matrix is reduced to a thickness,
wherein at least a portion of the wax particles have a particle size that is greater than the thickness of the matrix.

15. The method of claim 14, wherein at least 50% of the wax particles have a particle size greater than the thickness of the matrix.

16. The pre-treatment coating of claim 1, wherein the matrix coating further comprises boric acid and the binder is cross-linkable by the boric acid.

17. The printable medium of claim 8, wherein the matrix further comprises boric acid and the binder is cross-linkable by the boric acid.

18. The method of claim 14, wherein the matrix further comprises boric acid and the binder is cross-linkable by the boric acid.

* * * * *